(12) United States Patent
Liu et al.

(10) Patent No.: US 12,292,559 B2
(45) Date of Patent: May 6, 2025

(54) SYSTEM OF AUTOMATIC ADJUSTMENT OF LASER REFLECTION PATH

(71) Applicant: North University of China, Taiyuan (CN)

(72) Inventors: Jun Liu, Taiyuan (CN); Zongmin Ma, Taiyuan (CN); Jun Xu, Taiyuan (CN); Jun Tang, Taiyuan (CN); Yunbo Shi, Taiyuan (CN); Huanfei Wen, Taiyuan (CN); Cheng Dong, Taiyuan (CN); Huiyun Wang, Taiyuan (CN)

(73) Assignee: North University of China, Taiyuan (CN)

( * ) Notice: Subject to any disclaimer, the term of this patent is extended or adjusted under 35 U.S.C. 154(b) by 584 days.

(21) Appl. No.: 17/236,353

(22) Filed: Apr. 21, 2021

(65) Prior Publication Data

US 2021/0333531 A1    Oct. 28, 2021

(30) Foreign Application Priority Data

Apr. 28, 2020 (CN) .......................... 202010346988.2

(51) Int. Cl.
| | | |
|---|---|---|
| G02B 21/00 | (2006.01) | |
| G02B 21/02 | (2006.01) | |
| G02B 21/36 | (2006.01) | |

(52) U.S. Cl.
CPC ......... *G02B 21/025* (2013.01); *G02B 21/361* (2013.01)

(58) Field of Classification Search
CPC ................ G02B 21/00; G02B 21/0004; G02B 21/0016; G02B 21/002; G02B 21/0024; G02B 21/0028; G02B 21/0032; G02B 21/0036; G02B 21/0052; G02B 21/008; G02B 21/0088; G02B 21/0096; G02B 21/02; G02B 21/026; G02B 21/06; G02B 21/24; G02B 21/241; G02B 21/242; G02B 21/244; G02B 21/245; G02B 21/32;
(Continued)

(56) References Cited

U.S. PATENT DOCUMENTS

| | | | | |
|---|---|---|---|---|
| 8,024,816 | B2 * | 9/2011 | Iyoki | G01Q 10/06 850/2 |
| 8,887,311 | B1 * | 11/2014 | Kirishima | G01Q 40/00 850/8 |
| 2015/0121615 | A1 * | 5/2015 | Kay | A47K 3/20 4/607 |

FOREIGN PATENT DOCUMENTS

| | | | |
|---|---|---|---|
| JP | 2007-170873 | * | 7/2007 |
| JP | 4174357 | * | 10/2008 |

* cited by examiner

*Primary Examiner* — Thong Q Nguyen
(74) *Attorney, Agent, or Firm* — TROUTMAN PEPPER LOCKE LLP; Christopher C. Close, Jr.

(57) ABSTRACT

A system of automatic adjustment of a laser reflection path, comprising a central processing device, a driving device, a four-quadrant photodetector, a driving arm, a micro cantilever, a sample, a sample placing table, a light reflector, a laser, a CCD equipped with an optical microscope, a vibration sensor, a signal processing circuit, a display device, a storage device, and a control device; a system of automatic adjustment of the laser reflection path is controlled by the control device, wherein a laser beam is emitted by the laser, an image collected by the CCD equipped with the optical microscope is processed by the central processing device to identify the micro cantilever, and then a driving arm is driven by a driving device to drive the micro cantilever to move to the center of a laser spot, during which vibration signals of the driving arm are also under monitoring.

11 Claims, 5 Drawing Sheets

(58) Field of Classification Search
CPC .... G02B 21/36; G02B 21/361; G02B 21/362; G02B 21/365; G02B 21/368
USPC .................................................. 359/368–398
See application file for complete search history.

SYSTEM OF AUTOMATIC ADJUSTMENT OF LASER REFLECTION PATH

CROSS REFERENCE TO RELATED APPLICATIONS

This application claims priority, and benefit under 35 U.S.C. § 119(e) of Chinese Patent Application No. 202010346988.2 filed 28 Apr. 2020. The disclosure of the prior application is hereby incorporated by reference as if fully set forth below.

TECHNICAL FIELD

The present disclosure relates to the field of light path adjustment, in particular to a system of automatic adjustment of laser reflection path.

BACKGROUND

With the deepening of people's exploration of nanotechnology, Atomic Force Microscope (AFM) has become an important tool for observing and manipulating nano-scale substances since it came out in 1986. Without being limited by sample conductivity, it is widely used in many fields such as physics, chemistry, medicine, biology, microelectronics, material science, micromechanics, and micro-nano technology. In recent years, many significant achievements have been made in researches in the biomedical field, especially researches on biological cells and other fields.

AFM, an instrument for imaging micro-nano scale objects by utilizing the interaction force between atoms and molecules, is mainly composed of a micron-scale micro cantilever, a probe below the micro cantilever which has a nanometer-order radius of curvature, a four-quadrant photodetector, a laser and a piezoelectric ceramic scanner. It works according to the following principle: a laser spot irradiates on the micro cantilever above the probe, and the spot is reflected by the micro cantilever to the center of the four-quadrant detector. Contact between the probe and a testing sample may create a tiny action force which deviates the micro cantilever and thus deviates the light spot reflected to the four-quadrant detector from the center. By controlling the piezoelectric ceramic scanner, the light spot reflected to the four-quadrant detector stays at the center, and a surface morphology of the sample may be calculated via a certain imaging method.

In the prior art, the AFM laser reflection path mainly relies on manual adjustment by the specific implementation method as follows: firstly, the laser or a probe module is adjusted to make the laser spot irradiate onto a millimeter-order light reflecting sheet behind the micro cantilever, then the spot is gradually positioned to irradiate onto an area of the micro cantilever above the probe, and then the four-quadrant detector is adjusted to reflect the spot to the central position of the same. During the adjustment, the CCD equipped with the microscope may be used for auxiliary observation of the spot position. The method of manual adjustment is weak in operability and complicated in process, the optical path requires readjustment every time the probe is replaced, which is prone to fatigue or even damage to the operator's eyes.

SUMMARY

Therefore, in order to overcome problems mentioned above, a system of automatic adjustment of a laser reflection path, including a central processing device, a driving device, a four-quadrant photodetector, a driving arm, a micro cantilever, a sample, a sample placing table, a light reflector, a laser, a CCD equipped with an optical microscope, a vibration sensor, a signal processing circuit, a display device, a storage device, and a control device; a system of automatic adjustment of the laser reflection path is controlled by the control device, wherein a laser beam is emitted by the laser, an image collected by the CCD equipped with the optical microscope is processed by the central processing device to identify the micro cantilever, and then a driving arm is driven by a driving device to drive the micro cantilever to move to the center of a laser spot, during which vibration signals of the driving arm are also under monitoring so as to ensure the movement accuracy of the micro cantilever.

The technical schemes adopted for implementation of the present disclosure include: a system of automatic adjustment of a laser reflection path, including a central processing device, a driving device, a four-quadrant photodetector, a driving arm, a micro cantilever, a sample placing table, a light reflector, a laser, a CCD equipped with an optical microscope, and a control device;

Wherein, the CCD equipped with the optical microscope is disposed right above the sample placing table, the sample is placed on the sample placing table, a laser emission terminal of the laser has the light reflector arranged in front of the same, the four-quadrant photodetector and the laser are arranged on a same horizontal plane, the driving device drives the driving arm, the micro cantilever is positioned below the driving arm, the CCD equipped with the optical microscope is bidirectionally connected with the central processing device, an input terminal of the laser and an input terminal of the driving device are both connected with an output terminal of the central processing device, an output terminal of the four-quadrant photodetector is connected with an input terminal of the central processing device, and an output terminal of the control device is connected with an input terminal of the central processing device;

Wherein, a user inputs a magnification value of the CCD equipped with the optical microscope via the control device, the control device transmits the magnification value of the CCD equipped with the optical microscope input by the user to the central processing device which then transmits the received magnification value of the CCD equipped with the optical microscope to the CCD equipped with the optical microscope, the CCD equipped with the optical microscope adjusts its magnification to the received magnification accordingly, the user controls the central processing device via the control device to enable the laser to emit laser beams which pass through the light reflector and are reflected onto the micro cantilever, the CCD equipped with the optical microscope receives image information on the micro cantilever, and transmits the collected image information to the central processing device; the central processing device processes the received image information to identify the micro cantilever, obtains a relationship between a driving arm displacement distance and the pixel position variation in the CCD image, and finally, by virtue of the relationship mentioned above, controls the driving device to drive the driving arm to move the micro cantilever to a central position of a laser beam spot reflected by the light reflector.

In comparison to the prior art, the present disclosure provides the following beneficial effects:

A system of automatic adjustment of a laser reflection path, including a central processing device, a driving device, a four-quadrant photodetector, a driving arm, a micro cantilever, a sample, a sample placing table, a light reflector, a laser, a CCD equipped with an optical microscope, a vibration sensor, a signal processing circuit, a display device, a storage device, and a control device; a system of automatic adjustment of the laser reflection path is controlled by the control device, wherein a laser beam is emitted by the laser, an image collected by the CCD equipped with the optical microscope is processed by the central processing device to identify the micro cantilever, and then a driving arm is driven by a driving device to drive the micro cantilever to move to the center of a laser spot, during which vibration signals of the driving arm are also under monitoring so as to ensure the movement accuracy of the micro cantilever.

Figure 1:
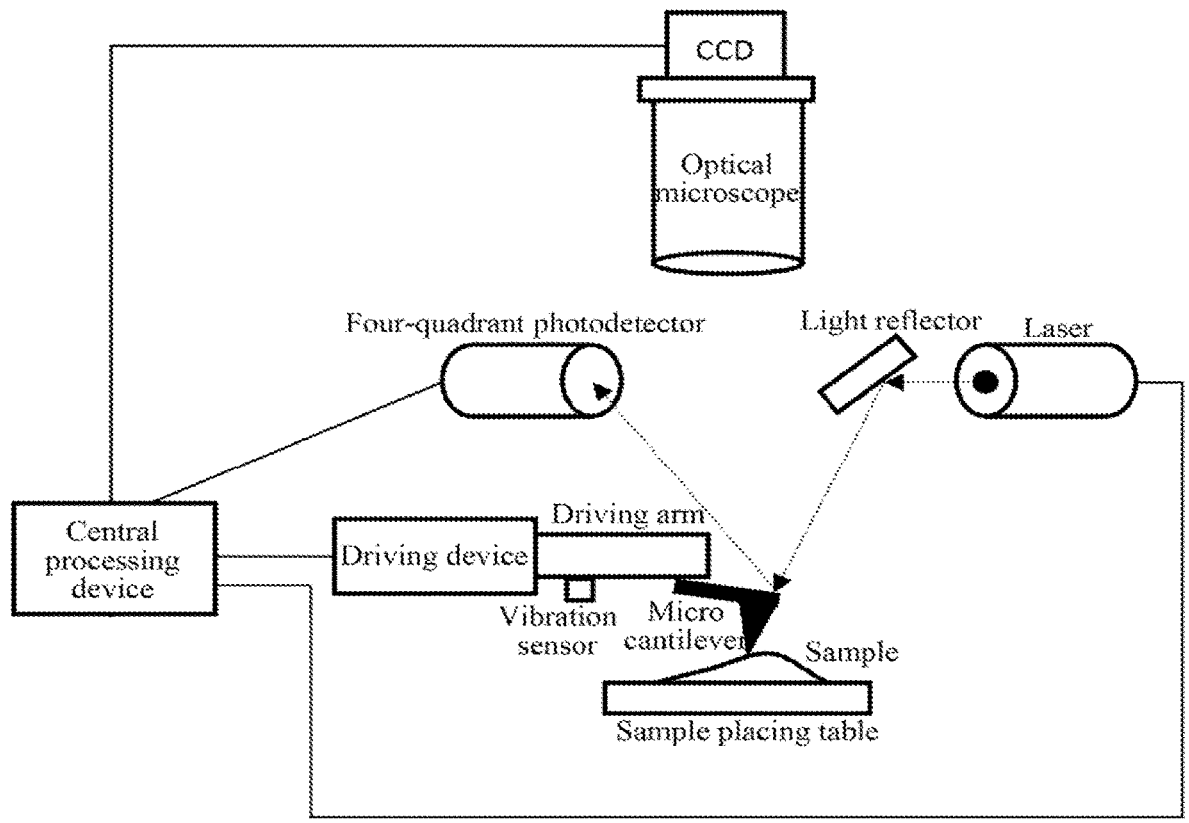
FIG. 1 is a structure diagram of the system of automatic adjustment of the laser reflection path in accordance with the present disclosure.

Reference numerals in the drawings include: 1—micro cantilever, 2—driving arm, 3—the second lead screw, 4—the first lead screw, 5—connector.

DETAILED DESCRIPTION

The system of automatic adjustment of the laser reflection path of the present disclosure will be described in detail with reference to figures and embodiments below.

Figure 2:
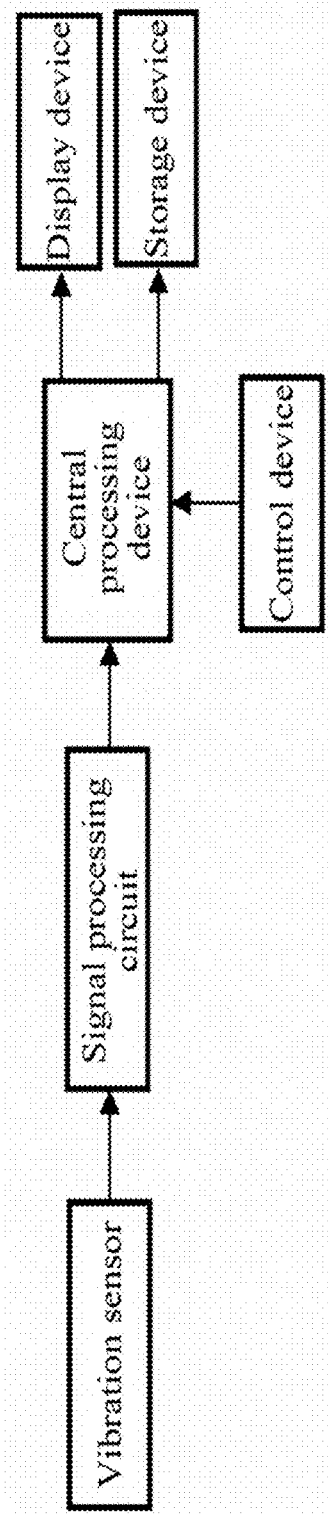
FIG. 2 is a schematic diagram of the system of automatic adjustment of the laser reflection path in accordance with the present disclosure.

As shown in FIGS. 1 to 2, the system of automatic adjustment of the laser reflection path provided in the present disclosure includes a central processing device, a driving device, a four-quadrant photodetector, a driving arm, a micro cantilever, a sample, a sample placing table, a light reflector, a laser, a CCD equipped with an optical microscope, a vibration sensor, a signal processing circuit, a display device, a storage device, and a control device.

Among the devices mentioned above, the CCD equipped with the optical microscope is disposed right above the sample placing table, the sample is placed on the sample placing table, a laser emission terminal of the laser has the light reflector arranged in front of the same, the four-quadrant photodetector and the laser are arranged on a same horizontal plane, the driving device drives the driving arm, the micro cantilever is positioned below the driving arm, the vibration sensor is arranged on the driving arm, the CCD equipped with the optical microscope is bidirectionally connected with the central processing device, an input terminal of the laser and an input terminal of the driving device are both connected with an output terminal of the central processing device, an output terminal of the four-quadrant photodetector is connected with an input terminal of the central processing device, an output terminal of the vibration sensor is connected with an input terminal of the signal processing circuit, an output terminal of the signal processing circuit is connected with the input terminal of the central processing unit, an input end of the control device is connected with the input terminal of the central processing unit, and an input terminal of the display device and an input terminal of the storage device are both connected with the output terminal of the central processing unit.

A user inputs a magnification value of the CCD equipped with the optical microscope via the control device, the control device transmits the magnification value of the CCD equipped with the optical microscope input by the user to the central processing device which then transmits the received magnification value of the CCD equipped with the optical microscope to the CCD equipped with the optical microscope, the CCD equipped with the optical microscope adjusts its magnification to the received magnification accordingly, the user controls the central processing device via the control device to enable the laser to emit laser beams which pass through the light reflector and are reflected onto the micro cantilever, the CCD equipped with the optical microscope receives image information on the micro cantilever, and transmits the collected image information to the central processing device; the central processing device processes the received image information to identify the micro cantilever, obtains a relationship between a driving arm displacement distance and the pixel position variation in the CCD image, and finally, by virtue of the relationship mentioned above, controls the driving device moves the micro cantilever to a central position of a laser beam spot reflected by the light reflector so as to drive the driving arm. At this point, the driving device drives the driving arm to move, the vibration sensor collects vibration signals of the driving arm during displacement and transmits the collected vibration signals to the signal processing circuit which processes and transmits the received vibration signals to the central processing device; the central processing device transmits the received vibration signals to the display device for display and stores the received vibration signals to the storage device for storage. The user then gets the vibration signals through the display device. If the vibration signals are greater than a pre-set threshold, the user sends a stop instruction to the central processing device through the control device. After receiving the stop instruction, the central processing device controls the laser to stop it from emitting laser beams and the driving device stops operation.

Still further, the central processing device also contains a signal processing module which extracts characteristic quantities from the received vibration signals, wherein the extraction includes the following specific steps:

In Step 1: vibration signals collected in time T are segmented according to pre-set sampling time periods, wherein the sampling time periods are identical for segmenting time T into n sampling time periods, and the vibration signals in the first time period are $X_1 \cdot \sin(\omega_1 t)$, the vibration signals in the second time period are $X_2 \cdot \sin(\omega_2 t)$, and so on, the vibration signals in the nth time period are $X_n \cdot \sin(\omega_n t)$; wherein $X_n$ is an amplitude in the nth time period and $\omega_n$ is a frequency in the nth time period;

In Step 2: vibration signals in the synthesized time T are $X \cdot \sin(\omega t)$, wherein X is a characteristic value of the amplitude of the vibration signals in the synthesized time T, and $\omega$ is a frequency characteristic value of the amplitude of the vibration signals in the synthesized time T, so that $$X \cdot \sin(\omega t) = X_1 \cdot \sin(\omega_1 t) + X_2 \cdot \sin(\omega_2 t) + \ldots + X_n \cdot \sin(\omega_n t);$$

In Step 3: the vibration signals $X \cdot \sin(\omega t)$ are superposed in frequency, so that $$X \cdot \omega^2 \cdot \sin(\omega t) = X_1 \cdot \omega_1^2 \cdot \sin(\omega_1 t) + X_2 \cdot \omega_2^2 \cdot \sin(\omega_2 t) + \ldots + X_n \cdot \omega_n^2 \cdot \sin(\omega_n t)$$

In Step 4: characteristic parameters are solved so that $$\omega = \sqrt{\frac{\sum_{i=1}^{n}[X_i \cdot \omega_i^2 \cdot \sin(\omega_i t)]}{\sum_{i=1}^{n}[X_i \cdot \sin(\omega_i t)]}}$$

$$X = \frac{\sum_{i=1}^{n}[X_i \cdot \sin(\omega_i t)]}{\sin(\omega_i t)}$$

Given that pre-set thresholds are ω max and X max, if ω>ω max or X>X max for a vibration signal, the user sends a stop instruction to the central processing device through the control device, the central processing device receives the stop instruction, controls the laser to stop it from emitting laser beams, and the driving device stops operation.

In the embodiment described above, the system of automatic adjustment of the laser reflection path includes a central processing device, a driving device, a four-quadrant photodetector, a driving arm, a micro cantilever, a sample, a sample placing table, a light reflector, a laser, a CCD equipped with an optical microscope, a vibration sensor, a signal processing circuit, a display device, a storage device, and a control device: a system of automatic adjustment of the laser reflection path is controlled by the control device, wherein a laser beam is emitted by the laser, an image collected by the CCD equipped with the optical microscope is processed by the central processing device to identify the micro cantilever, and then a driving arm is driven by a driving device to drive the micro cantilever to move to the center of a laser spot, during which vibration signals of the driving arm are also under monitoring so as to ensure the movement accuracy of the micro cantilever.

The driving device includes a stepping motor, a first lead screw 4 and a second lead screw 3, wherein the first lead screw 4 and the second lead screw 3 are connected through a connector 5, the driving arm 2 is connected with the first lead screw 4 in a threaded manner, the micro cantilever 1 is connected with the driving am 2, the driving arm 2 may be driven by the first lead screw 4 to enable fine adjustments left and right, the second lead screw 3 may drive the connector 5 that in turn drives the micro cantilever 1, the driving arm 2 and the first lead screw 4 to enable fine adjustment up and down, and the first lead screw 4 and the second lead screw 3 are connected with the stepping motor at their ends so as to provide high-precision micro actuation for the lead screws.

Specifically, the control device transmits the magnification value of the CCD equipped with the optical microscope input by the user to the central processing device, and the magnification is 3 times.

Specifically, the CCD equipped with the optical microscope transmits the collected image information to the central processing device, and the central processing device processes the received image information to identify the micro cantilever, which includes the following steps:

In Step 1: since the micro cantilever image collected by the CCD equipped with the optical microscope is not a complex image, the image information only covers the micro cantilever and the sample. Therefore, in order to speed up the image processing, the central processing device converts a 3-channel 24-bit image collected by the CCD equipped with the optical microscope into a single-channel 8-bit image as the following formula:

$$I(x,y)=0.3 \times I_R(x,y)+0.59 \times I_G(x,y)+0.11 \times I_B(x,y);$$

Wherein, $I_R(x,y)$, $I_G(x,y)$, and $I_B(x,y)$ are respectively red, green and blue components of the image collected by the CCD equipped with the optical microscope, $I(x,y)$ is a grey value of the converted image, and $(x,y)$ represents horizontal and vertical coordinates of the image;

In Step 2: the grey value $I(x,y)$ is enhanced as the following formula:

$$G_0(x,y) = 255 \times \sum_{i=0}^{k}\frac{n_i}{n}$$

Wherein, $G_0(x,y)$ is a grey value of the converted image, k is a coefficient of the grey enhancement adjustment, $n_i$ is the number of pixels of the grey value I, and n is the number of total pixel values of the image;

In Step 3: for images with different brightness, regions with high contrast ratios are identified for segmenting the image of the micro cantilever as the following formula:

$$\sigma^2=\omega_0(\mu_0-\mu)^2+\omega_1(\mu_1-\mu)^2;$$

In this formula, $\omega_0$ represents the proportion of target pixels, $\omega_1$ represents the proportion of background pixels, $\mu_0$ represents the grey average of target pixels, $\mu_1$ represents the grey average of background pixels, $\mu$ represents the grey average of the whole image, and $\sigma^2$ represents the inter-class variance;

The image has N grey levels in total. While selecting a threshold T within [0, N−1] and setting the maximum $\sigma^2$ to the best threshold, we mark the micro cantilever area (sized as 100×100 pixels) above the probe on the four-quadrant photodetector according to the coordinates.

Specifically, the central processing device processes the received image information to identify the micro cantilever, obtains a relationship between a driving arm displacement distance and the pixel position variation in the CCD image, which includes the following steps:

In Step 1: an abscissa of the extreme edge of the micro cantilever area is used as the reference point $X_0$ when the maximum $\sigma^2$ acts as the best threshold;

In Step 2: a stepping distance of the driving device is kept below 100 μm, wherein at the first time, when an actual abscissa of the extreme edge of the micro cantilever area is $X_1$, the abscissa has a variation of $\Delta X_3=|X_1-X_0|$, and the displacement distance $|L_0|$ of the driving device is obtained, with all the above values being absolute values;

In Step 3: the above Step 2 is repeated to obtain the other two groups of corresponding relational expressions: $\Delta X_1=|X_1-X_2|$, $|L_1|$, $\Delta X_2=|X_2-X_3|$, $|L_2|$, so that the relation between the image pixel variation and the displacement distance of the driving device is as follows:

$$\begin{bmatrix}a\\b\end{bmatrix} = [A^T A]^{-1} A^T B$$

In the above formula, at the second time, the actual abscissa of the extreme edge of the micro cantilever area is $X_2$, and the displacement distance $|L_1|$ of the driving device is obtained; at the third time, the actual abscissa of the extreme edge of the micro cantilever area is $X_3$, and the displacement distance $|L_2|$ of the driving device is obtained, wherein an interval between the first time and the second time is identical with that between the second time and the third time, and a and b are coefficients to be solved, with the matrix A being $$\begin{bmatrix} L_0 & 1 \\ L_1 & 1 \\ L_2 & 1 \end{bmatrix}$$

and the matrix B being $$\begin{bmatrix} \Delta X_0 \\ \Delta X_1 \\ \Delta X_2 \end{bmatrix}.$$

Figure 3:
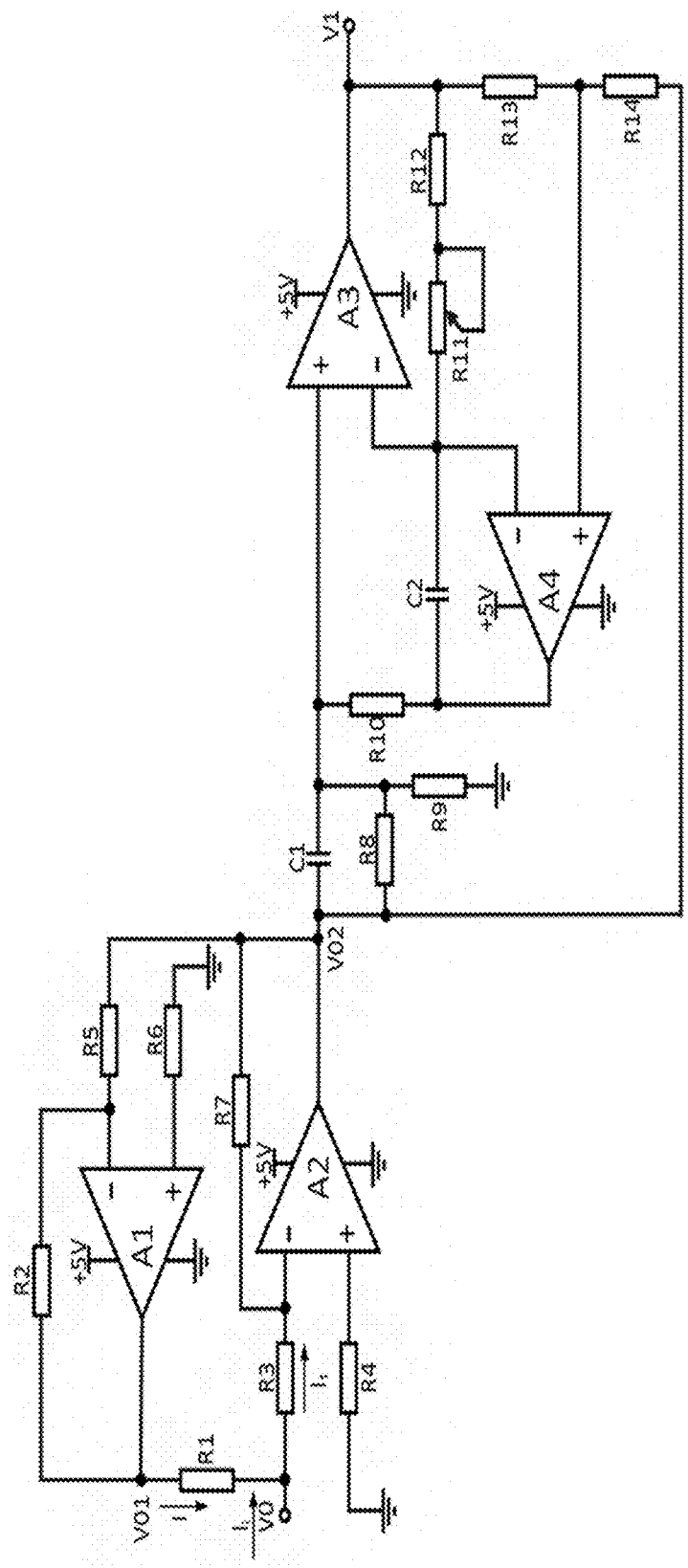
FIG. 3 is a circuit diagram of the signal processing circuit in accordance with the present disclosure.

As shown in FIG. 3, the vibration sensor collects a vibration signal of the driving arm during displacement, converts the collected vibration signal into a voltage signal V0, and transmits the voltage signal V0 to the signal processing circuit; wherein V1 is a voltage signal processed by the signal processing circuit, the signal processing circuit includes a signal amplifying unit and a signal filtering unit, the output terminal of the vibration sensor is connected with an input terminal of the signal amplifying unit; an output terminal of the signal amplifying unit is connected with an input terminal of the signal filtering unit, and an output terminal of the signal filtering unit is connected with the input terminal of the central processing device.

Specifically, the signal amplifying unit includes operational amplifiers A1-A2 and resistors R1-R7.

Among the amplifiers and resistors mentioned above, the output terminal of the vibration sensor is connected with one end of a first resistor R1 where the first resistor R1 is also connected with one end of a third resistor R3, the other end of the first resistor R1 is also connected with an output terminal of a first operational amplifier A1, the other end of the first resistor R1 is also connected with one end of a second resistor R2, the other end of the second resistor R2 is connected with an inverting input terminal of the first operational amplifier A1, the other end of the third resistor R3 is connected with an inverting input terminal of a second operational amplifier A2, the other end of the third resistor R3 is connected with one end of a seventh resistor R7, one end of a fourth resistor R4 is grounded, the other end of the fourth resistor R4 is connected with an in-phase input terminal of the second operational amplifier A2, one end of a fifth resistor R5 is connected with the other end of the second resistor R2, the other end of the fifth resistor R5 is connected with an output terminal of the second operational amplifier A2, one end of a sixth resistor R6 is connected with an in-phase input terminal of the first operational amplifier A1, the other end of a sixth resistor R6 is grounded, the other end of a seventh resistor R7 is connected with the output terminal of the second operational amplifier A2, and the output terminal of the second operational amplifier A2 is connected with an input terminal of the signal filtering unit. Specifically, the signal filtering unit includes resistors R8-R14, capacitors C1-C2, and operational amplifiers A3-A4.

Among the devices mentioned above, the output terminal of the signal amplifying unit is connected with one end of the first capacitor C1 where the first capacitor C1 is also connected with one end of an eighth resistor R8, the other end of the eighth resistor R8 is connected with the other end of the capacitor C1, one end of a ninth resistor R9 is grounded, the other end of the ninth resistor R9 is connected with the other end of the resistor R8, the other end of the first capacitor C1 is connected with an in-phase input terminal of a third operational amplifier A3, one end of a tenth resistor R10 is connected with one end of a second capacitor C2, the other end of the tenth resistor R10 is connected with an in-phase input terminal of a third operational amplifier A3, one end of the resistor R10 is also connected with an output terminal of the fourth operational amplifier A4, the other end of the second capacitor C2 is connected with an inverting input terminal of the operational amplifier A3, one end of a slide rheostat R11 is connected with the inverting input terminal of the operational amplifier A3 where the slide resistor R11 is also connected with an inverting input terminal of a fourth operational amplifier A4 and with slide rheostat R11 the other end of the second capacitor C2, one end of a twelfth resistor R12 is connected with the other end of the slide rheostat R11, the other end of the twelfth resistor R12 is connected with an output terminal of the operational amplifier A3, one end of a fourteenth resistor R14 is connected with one end of the resistor R8, the other end of the fourteenth resistor R14 is connected with an in-phase input terminal of the operational amplifier A4 where the fourteenth resistor R14 is also connected with one end of a thirteenth resistor R13, the other end of the thirteenth resistor R3 is connected with the other end of the twelfth resistor R12 where the thirteenth resistor R13 is also connected with the output terminal of the third operational amplifier A3, the output terminal of the third operational amplifier A3 is connected with the input terminal of the central processing device, and the signal filtering unit transmits the voltage signal V1 to the central processing device.

In the embodiment described above, the signal processing circuit has a noise within 2.75 nV and a drift of 1.25 μV/° C. The models of operational amplifiers A1-A2 are both LT1012, and the models of operational amplifiers A3-A4 are LT1192.

In the signal amplifying unit, the resistance values of resistors R1, R2, R3, R4, R5, R6 and R7 are 10 kΩ, 20 kΩ, 10 kΩ, 4.7 kΩ, 20 kΩ, 4.7 kΩ, and 20 kΩ respectively.

The signal amplifying unit provided in the present disclosure is composed of operational amplifiers A1-A2, wherein a voltage signal collected by the sensor is V0, and an input current signal of the signal amplifying circuit is I i. At this point, the current flowing through the resistor R1 is I, the resistance flowing through the resistor R3 is I 1, the voltage signal output by the operational amplifier A1 is V01, and the voltage signal output by the signal amplifying unit is V02.

In the signal amplifying unit provided in the present disclosure, the current $I_1$ in the input circuit is mainly provided by the current I of an operational feedback circuit, so the power supply $I_i$ supplied by the input circuit for obtaining voltage signals collected by the sensor can be greatly reduced. In addition, the input impedance of the signal amplifying unit provided in the present disclosure is extremely high, wherein the operational amplifier A2 acts as the primary amplifier, and the operational amplifier A1 provides the input current to the operational amplifier A2, so that the input circuit provides little current for obtaining voltage signals V0 collected by the sensor, thus greatly improving the input impedance.

At this point, the operational amplifiers A1 and A2 are both ideal amplifiers, and an input current $I_i$ is:

$$I_i = \frac{V0}{R3} + \frac{V0 - V01}{R1}$$

Then:

$$V01 = -\frac{R2}{R5} \cdot V02$$

and, $$V02 = -\frac{R7}{R3} \cdot V0$$

So that:

$$V02 = \left(-\frac{R2}{R5}\right) \cdot \left(-\frac{R7}{R3}\right) \cdot V0 = 2V0$$

And so that:

$$I_i = \frac{V0}{R3} + \frac{V0 - 2V0}{R1} = \frac{R1 - R3}{R1 \cdot R3} V0$$

Therefore, when resistors R1=R3, the input current $I_i$ will be supplied all by the operational amplifier A1, so the input impedance at this point is extremely large. However, in actual usage, there definitely is a certain deviation between R1 and R3. If the deviation is 0.01% and R3=10 kΩ, the input impedance can be as high as 100 MΩ, which cannot be achieved/realized by amplifying circuits in the prior art.

The signal amplifying unit provided in the present disclosure has an open-loop gain of more than 160 dB, a time drift of less than ±1 μv/24 h, a temperature drift of less than ±1 μv/° C., and a low-frequency noise (an effective value) of less than 0.5 μV which may effectively and highly precise amplify the voltage signals collected by the sensor.

In the signal filtering unit, the resistance values of resistors R8 and R9 are 47 kΩ and 94 kΩ, the resistance value of resistor R10 is set according to the value of capacitor C1 (the specific formula is shown as follows), resistor R11 is a sliding rheostat with a resistance value of 100 kΩ, the resistance values of resistors R12, R13, R14 are 10 kΩ, 10 kΩ, 10 kΩ, the capacitance values of capacitors C1 and C2 are 0.01 μF and 0.01 μF. The filtering effect is achieved by adjusting the sliding rheostat R11.

Wherein, $$R10 = \frac{1}{2 \times \pi \times C1 \times \text{frequency}}$$

In the signal filtering unit, it is not necessary to precisely adjust the filtering central frequency. A stable filtering central frequency can be obtained so long as the resistance value of resistor R12 is set to be consistent with that of resistor R13, and sliding rheostat R11 is also arranged which may finely adjust the filtering central frequency, which is a great advantage of the signal filtering unit provided in the present disclosure differing from the prior art.

Still further, by setting the resistor R9=20R8 during filtering, it may better reduce the noise signal in the voltage signal V02.

Figure 4:
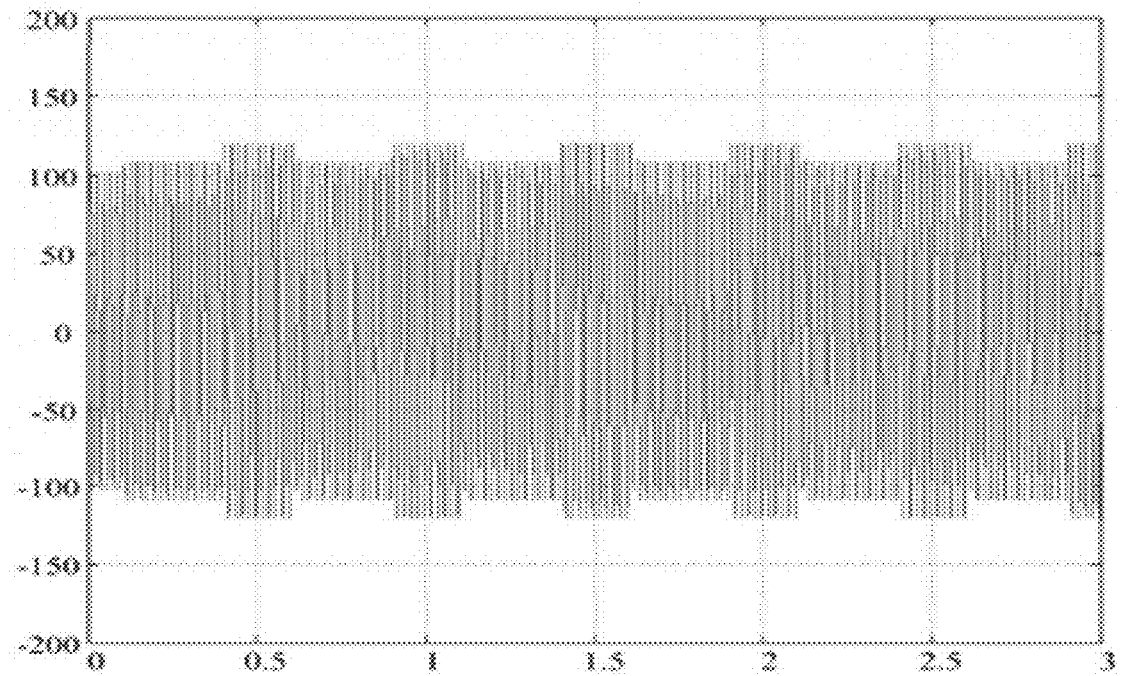
FIG. 4 is an oscillogram of the vibration signals processed by the signal processing circuit.
Figure 5:
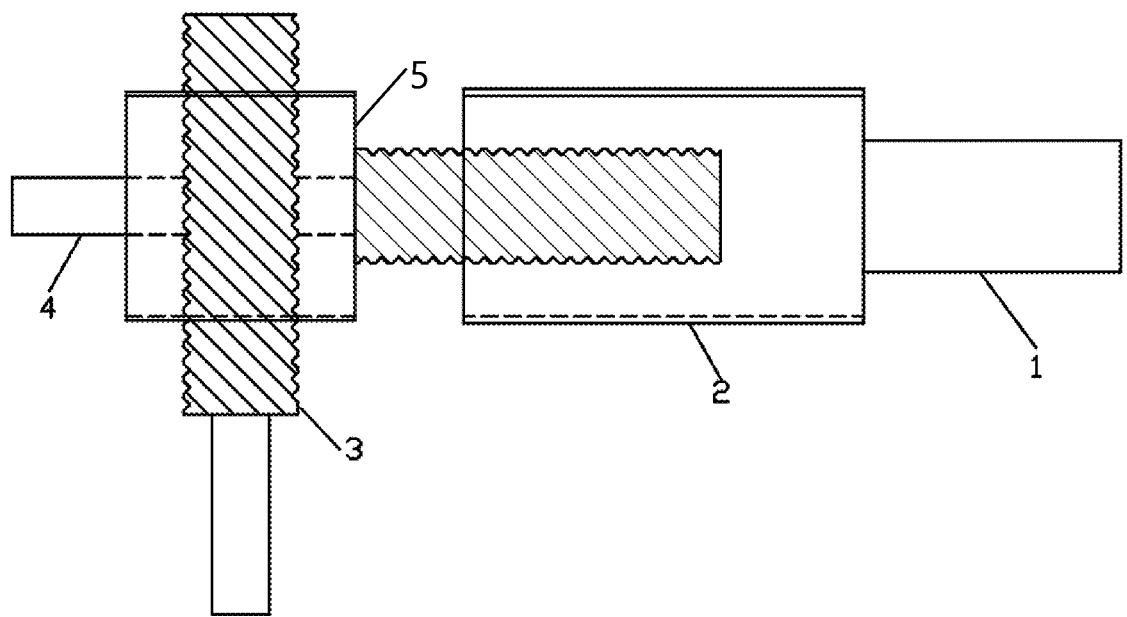
FIG. 5 is a structure diagram of the driving device.

Since the signal collected by the vibration sensor is a weak voltage signal, the signal amplifying unit amplifies the voltage V0 output by the vibration sensor through operational amplifiers A1-A2 and resistors R1-R7. The signal amplifying unit composed of the operational amplifiers A1-A2 and the resistors R1-R7 has only a drift of 1.25 μV/° C., an offset less than 2 μV, a bias current of 100 pA and a noise of 2.75 nV in a bandwidth from 0.1 Hz to 10 Hz, wherein a signal filtering unit uses resistors R8-R14 and capacitors C1-C2, and the operational amplifiers A3-A4 filter the amplified electric signals, thus improving the precision of vibration detection. As shown in FIG. 4, this is an oscillogram of the vibration signals processed by the signal processing circuit (wherein the abscissa is a time axis and the ordinate is a voltage axis).

Specifically, the control device is a touch control-instruction input device.

This written description uses examples to disclose this disclosure, including the best modes, and also enables any person skilled in the art to practice this disclosure, including manufacturing and using any device or system and performing any methods included herein. The patentable scope of the present disclosure is limited by the claims, and may include other examples contemplated by those skilled in the art. It is intended that these other examples fall within the claimed scope if they include structural elements that do not differ from the literal language of the claims, or if they include equivalent structural elements that do not differ materially from the literal language of the claims.

What is claimed is:

1. A system of automatic adjustment of a laser reflection path, comprising a central processing device, a driving device, a four-quadrant photodetector, a driving arm, a micro cantilever, a sample placing table, a light reflector, a laser, a charge-coupled device ("CCD") which is equipped with an optical microscope, and a control device;

wherein, the CCD is disposed right above the sample placing table, a sample is placed on the sample placing table, a laser emission terminal of the laser has the light reflector arranged in front of the same, the four-quadrant photodetector and the laser are arranged on a same horizontal plane, the driving device drives the driving arm, the micro cantilever is positioned below the driving arm, the CCD is bidirectionally connected with the central processing device, an input terminal of the laser and an input terminal of the driving device are both connected with an output terminal of the central processing device, an output terminal of the four-quadrant photodetector is connected with an input terminal of the central processing device, and an output terminal of the control device is connected with an input terminal of the central processing device;

wherein, a user inputs a magnification of the optical microscope in the CCD via the control device, the control device transmits the magnification of the optical microscope input by the user to the central processing device which then transmits a received magnification of the optical microscope to the CCD, the CCD adjusts a current magnification of the optical microscope to the received magnification accordingly, the user controls the central processing device via the control device to enable the laser to emit laser beams which is reflected by the light reflector towards the micro cantilever, the CCD receives image on the micro cantilever, and transmits the image to the central processing device; the central processing device processes the image to identify an abscissa of an extreme edge of the micro cantilever, and according to a relationship between a driving arm displacement distance and a pixel position variation in the image and based on the abscissa of the extreme edge of the micro cantilever, controls the driving device to drive the driving arm to move the micro cantilever such that a light spot reflected from the micro cantilever to the four-quadrant photodetector stays at a center of the four-quadrant photodetector;

wherein the CCD transmits the image to the central processing device, and the central processing device processes the image to identify the abscissa of the extreme edge of the micro cantilever, which comprises following steps:

Step 1: the central processing device converts a 3-channel 24-bit image collected by the CCD into a single-channel 8-bit image as the following formula:

$$I(x,y)=0.3 \times I_R(x,y)+0.59 \times I_G(x,y)+0.11 \times I_B(x,y);$$

wherein, $I_R(x,y)$, $I_G(x,y)$, and $I_B(x,y)$ are respectively red, green and blue components of the image collected by the CCD, $I(x,y)$ is a grey value of the converted image, and $(x,y)$ represents horizontal and vertical coordinates of the image, Step 2: the grey value $I(x,y)$ is enhanced as the following formula:

$$G_0(x, y) = 255 \times \sum_{i=0}^{k} \frac{n_i}{n}$$

wherein, $G_0(x,y)$ is a grey value of the enhanced image, k is a coefficient of a grey enhancement adjustment, $n_i$ is a number of pixels of the grey value I, and n is a number of total pixel values of the image;

Step 3: for images with different brightness, regions with high contrast ratios are identified for segmenting the image of the micro cantilever as the following formula:

$$\sigma^2 = \omega_0(\mu_0-\mu)^2 + \omega_1(\mu_1-\mu)^2;$$

wherein, $\omega_0$ represents a proportion of target pixels, $\omega_1$ represents a proportion of background pixels, $\mu_0$ represents a grey average of target pixels, $\mu_1$ represents a grey average of background pixels, $\mu$ represents a grey average of the whole image, and $\sigma^2$ represents an inter-class variance;

wherein, the image has N grey levels in total, and a threshold T is assigned any value selected within [0, N-1], and a value of the threshold T corresponding to a maximum value of the inter-class variance $\sigma^2$ is set as a best threshold value, a micro cantilever area is marked above the probe on the four-quadrant photo-detector according to the coordinates;

wherein the central processing device obtains the relationship between the driving arm displacement distance and the pixel position variation in the image, which comprises following steps:

Step 1: the abscissa of the extreme edge of the micro cantilever area segmented based on the best threshold value corresponding to the maximum value of the inter-class variance $\sigma^2$ is used as a reference point $X_0$;

Step 2: a stepping distance of the driving arm is kept below 100 μm, wherein at a first moment, the driving arm is driven to move a predetermined displacement distance $|L_0|$, and an actual abscissa of the extreme edge of the micro cantilever area is $X_1$, the abscissa has a variation of $\Delta X_0 = |X_1-X_0|$, with all the above values being absolute values;

Step 3: at a second moment, the driving arm is driven to move a predetermined displacement distance $|L_1|$, and an actual abscissa of the extreme edge of the micro cantilever area is $X_2$, the abscissa has a variation of $\Delta X_1 = |X_1-X_2|$; at a third moment, the driving arm is driven to move a predetermined displacement distance $|L_2|$, and an actual abscissa of the extreme edge of the micro cantilever area is $X_3$, the abscissa has a variation of $\Delta X_2 = |X_2-X_3|$; with all the above values being absolute values, the relation between the image pixel variation and the displacement distance of the driving arm is as follows:

$$\begin{bmatrix} a \\ b \end{bmatrix} = [A^T A]^{-1} A^T B$$

wherein, $A^T$ in the above formula is a transpose of a matrix A, wherein an interval between the first moment and the second moment is identical with that between the second moment and the third moment, and a and b are coefficients to be solved, with the matrix A being $$\begin{bmatrix} L_0 & 1 \\ L_1 & 1 \\ L_2 & 1 \end{bmatrix}$$

and the matrix B being $$\begin{bmatrix} \Delta X_0 \\ \Delta X_1 \\ \Delta X_2 \end{bmatrix}.$$

2. The system of automatic adjustment of the laser reflection path according to claim 1, further comprising: a vibration sensor, a signal processing circuit, a display device and a storage device, wherein the vibration sensor is disposed on the driving arm, an output terminal of the vibration sensor is connected with an input terminal of the signal processing circuit, an output terminal of the signal processing circuit is connected with an input terminal of the central processing device, an input terminal of the display device and an input terminal of the storage device are both connected with the output terminal of the central processing device, during movement of the driving arm driven by the driving device, the vibration sensor collects vibration signals of the driving arm during displacement, and transmits the collected vibration signals to the signal processing circuit which processes and then transmits the received vibration signals to the central processing device, the central processing device transmits the received vibration signals to the display device for display and transmits the received vibration signals to the storage device for storage, and, in a case that the vibration signals are greater than a pre-set threshold, in response to receiving a stop instruction from the user via the control device, the central processing device controls the laser to stop it from emitting laser beams, and the driving device stops operation.

3. The system of automatic adjustment of the laser reflection path according to claim 2, wherein the central processing device also contains a signal processing module which extracts an amplitude feature of the vibration signals and a frequency feature of an amplitude of the vibration signals from the received vibration signals, wherein the extraction comprises the following specific steps:

Step 1: vibration signals collected in a time T are segmented according to pre-set sampling time periods, wherein the pre-set sampling time periods are identical and segment time T into n sampling time periods, and the vibration signals in a first time period are $X_1 \cdot \sin(\omega_1 t)$, the vibration signals in a second time period are $X_2 \cdot \sin(\omega_2 t)$, and so on, the vibration signals in an nth time period are $X_n \cdot \sin(\omega_n t)$ wherein $X_n$ is an amplitude in the nth time period, t is a moment in the time T and $\omega_n$ is a frequency in the nth time period;

Step 2: vibration signals in the time T are synthesized into $X \cdot \sin(\omega t)$, wherein X is the amplitude feature of the vibration signals in the time T, and $\omega$ is the frequency feature of the amplitude of the vibration signals in the time T, so that $$X \cdot \sin(\omega t) = X_1 \cdot \sin(\omega_1 t) + X_2 \cdot \sin(\omega_2 t) + \ldots + X_n \cdot \sin(\omega_n t), t \in T;$$

Step 3: the vibration signals $X \cdot \sin(\omega t)$ are superposed in frequency, so that $$X \cdot \omega^2 \cdot \sin(\omega t) = X_1 \cdot \omega_1^2 \cdot \sin(\omega_1 t) + X_2 \cdot \omega_2^2 \cdot \sin(\omega_2 t) + \ldots + X_n \cdot \omega_n^2 \cdot \sin(\omega_n t);$$

Step 4: the amplitude feature of the vibration signals and the frequency feature of the amplitude of the vibration signals are solved as follows:

$$\omega = \sqrt{\frac{\sum_{i=1}^{n}[X_i \cdot \omega_i^2 \cdot \sin(\omega_i t)]}{\sum_{i=1}^{n}[X_i \cdot \sin(\omega_i t)]}}$$

$$X = \frac{\sum_{i=1}^{n}[X_i \cdot \sin(\omega_i t)]}{\sin(\omega_i t)}$$

wherein pre-set thresholds are $\omega$ max and X max, and if $\omega > \omega$ max or $X > X$ max for a vibration signal, the user sends a stop instruction to the central processing device through the control device, the central processing device receives the stop instruction, controls the laser to stop it from emitting laser beams, and the driving device stops operation.

4. The system of automatic adjustment of the laser reflection path according to claim 2, wherein the vibration sensor collects vibration signals of the driving arm during displacement, converts the collected vibration signals into voltage signals V0, and transmits the voltage signals V0 to the signal processing circuit; wherein the voltage signals V0 is processed by the signal processing circuit to output voltage signals V1, the signal processing circuit comprises a signal amplifying unit and a signal filtering unit, the output terminal of the vibration sensor is connected with an input terminal of the signal amplifying unit; an output terminal of the signal amplifying unit is connected with an input terminal of the signal filtering unit, and an output terminal of the signal filtering unit is connected with the input terminal of the central processing device.

5. The system of automatic adjustment of the laser reflection path according to claim 4, wherein the signal amplifying unit comprises operational amplifiers A1-A2 and resistors R1-R7;

wherein, the output terminal of the vibration sensor is connected with one end of a first resistor R1 where the first resistor R1 is also connected with one end of a third resistor R3, a second end of the first resistor R1 is also connected with an output terminal of a first operational amplifier A1, a second end of the first resistor R1 is also connected with one end of a second resistor R2, a second end of the second resistor R2 is connected with an inverting input terminal of the first operational amplifier A1, a second end of the third resistor R3 is connected with an inverting input terminal of a second operational amplifier A2, the second end of the third resistor R3 is connected with one end of a seventh resistor R7, one end of a fourth resistor R4 is grounded, a second end of the fourth resistor R4 is connected with an in-phase input terminal of the second operational amplifier A2, one end of a fifth resistor R5 is connected with the second end of the second resistor R2, a second end of the fifth resistor R5 is connected with an output terminal of the second operational amplifier A2, one end of a sixth resistor R6 is connected with an in-phase input terminal of the first operational amplifier A1, a second end of a sixth resistor R6 is grounded, a second end of a seventh resistor R7 is connected with the output terminal of the second operational amplifier A2, the output terminal of the second operational amplifier A2 is connected with an input terminal of the signal filtering unit; and the signal filtering unit comprises resistors R8-R11, capacitors C1-C2, and operational amplifiers A3-A4;

wherein, the output terminal of the signal amplifying unit is connected with one end of the first capacitor C1 where the first capacitor C1 is also connected with one end of an eighth resistor R8, a second end of the eighth resistor R8 is connected with a second end of the capacitor C1, one end of a ninth resistor R9 is grounded, a second end of the ninth resistor R9 is connected with the second end of the eighth resistor R8, the second end of the first capacitor C1 is connected with an in-phase input terminal of a third operational amplifier A3, one end of a tenth resistor R10 is connected with one end of a second capacitor C2, a second end of the tenth resistor R10 is connected with an in-phase input terminal of a third operational amplifier A3, the one end of the tenth resistor R10 is also connected with an output terminal of the fourth operational amplifier A4, the second end of the second capacitor C2 is connected with an inverting input terminal of the operational amplifier A3, one end of a slide rheostat R11 is connected with the inverting input terminal of the operational amplifier A3 where the slide rheostat R11 is also connected with an inverting input terminal of a fourth operational amplifier A4 and with the slide rheostat R11 connected with the second end of the second capacitor C2, one end of a twelfth resistor R12 is connected with a second end of the slide rheostat R11, a second end of the twelfth resistor R12 is connected with an output terminal of the operational amplifier A3, one end of a fourteenth resistor R14 is connected with the one end of the resistor R8, a second end of the fourteenth resistor R14 is connected with an in-phase input terminal of the operational amplifier A4 where the fourteenth resistor R14 is also connected with one end of a thirteenth resistor R13, a second end of the thirteenth resistor R13 is connected with the second end of the twelfth resistor R12 where the thirteenth resistor R13 is also connected with the output terminal of the third operational amplifier A3, the output terminal of the third operational amplifier A3 is connected with the input terminal of the central processing device, and the signal filtering unit transmits the voltage signal V1 to the central processing device.

6. The system of automatic adjustment of the laser reflection path according to claim 2, wherein the control device transmits the magnification of the optical microscope input by the user to the central processing device, and the magnification is 3 times.

7. The system of automatic adjustment of the laser reflection path according to claim 2, wherein the driving device comprises a stepping motor, a first lead screw and a second lead screw, wherein the first lead screw and the second lead screw are connected through a connector, the driving arm is connected with the first lead screw in a threaded manner, the micro cantilever is connected with the driving arm, the driving arm is driven by the first lead screw to enable fine adjustments left and right, the second lead screw drives the connector that in turn drives the micro cantilever, the driving arm and the first lead screw to enable fine adjustment up and down, and the second lead screw and the first lead screw are connected with the stepping motor at their ends so as to provide micro actuation for the lead screws.

8. The system of automatic adjustment of the laser reflection path according to claim 1, wherein the control device transmits the magnification of the optical microscope input by the user to the central processing device, and the magnification is 3 times.

9. The system of automatic adjustment of the laser reflection path according to claim 1, wherein the control device is a touch control-instruction input device.

10. The system of automatic adjustment of the laser reflection path according to claim 1, wherein the driving device comprises a stepping motor, a first lead screw and a second lead screw, wherein the first lead screw and the second lead screw are connected through a connector, the driving arm is connected with the first lead screw in a threaded manner, the micro cantilever is connected with the driving arm, the driving arm is driven by the first lead screw to enable fine adjustments left and right, the second lead screw drives the connector that in turn drives the micro cantilever, the driving arm and the first lead screw to enable fine adjustment up and down, and the second lead screw and the first lead screw are connected with the stepping motor at their ends so as to provide micro actuation for the lead screws.

11. The system of automatic adjustment of the laser reflection path according to claim 1, wherein a pixel in the image is identified as a target pixel or a background pixel by comparing a grey level of the pixel with the value of the threshold T.

* * * * *